(12) United States Patent
Kasai

(10) Patent No.: US 10,166,764 B2
(45) Date of Patent: Jan. 1, 2019

(54) ELEMENT SUBSTRATE, PRINTHEAD, AND PRINTING APPARATUS

(71) Applicant: CANON KABUSHIKI KAISHA, Tokyo (JP)

(72) Inventor: Ryo Kasai, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/646,768

(22) Filed: Jul. 11, 2017

(65) Prior Publication Data

US 2018/0037025 A1     Feb. 8, 2018

(30) Foreign Application Priority Data

Aug. 5, 2016    (JP) ................................. 2016-154945

(51) Int. Cl.
    *B41J 2/045*        (2006.01)
    *H04N 1/00*        (2006.01)
    *H04N 1/40*        (2006.01)

(52) U.S. Cl.
    CPC ......... *B41J 2/04573* (2013.01); *B41J 2/0458* (2013.01); *B41J 2/04541* (2013.01); *B41J 2/04543* (2013.01); *H04N 1/00994* (2013.01); *H04N 1/40031* (2013.01)

(58) Field of Classification Search
    CPC ........................... B41J 2/04573; B41J 2/04543
    See application file for complete search history.

(56) References Cited

U.S. PATENT DOCUMENTS

| | | | |
|---|---|---|---|
| 5,300,968 A | * | 4/1994 | Hawkins .............. B41J 2/04541 323/313 |
| 6,170,933 B1 | * | 1/2001 | Nitta .................... B41J 2/04541 347/42 |
| RE44,825 E | | 4/2014 | Imanaka et al. |

(Continued)

FOREIGN PATENT DOCUMENTS

| | | |
|---|---|---|
| CN | 1118308 A | 3/1996 |
| CN | 1320521 A | 11/2001 |

(Continued)

OTHER PUBLICATIONS

U.S. Appl. No. 15/590,489, filed May 9, 2017.
Office Action dated Sep. 30, 2018, in counterpart application CN 201710564959.1 (10 pages).

*Primary Examiner* — Julian D Huffman
(74) *Attorney, Agent, or Firm* — Venable LLP

(57) ABSTRACT

An element substrate comprises: a data latch unit for latching, based on a first signal, first print data and second print data which have been received by a reception unit; a first driving unit for driving printing elements based on a timing of a second signal and a logical operation result of printing element selection data and the first print data latched by the data latch unit; a delay unit for delaying the second signal by a predetermined time; an operation result latch unit for latching, based on the delayed second signal, a result of a logical operation of the printing element selection data and the second print data latched by the data latch unit; and a second driving unit for driving the printing elements in accordance with the latched operation result and the delayed second signal.

8 Claims, 8 Drawing Sheets

(56) References Cited

U.S. PATENT DOCUMENTS

| | | | |
|---|---|---|---|
| 2005/0134620 A1* | 6/2005 | Hirayama | B41J 2/04541 347/9 |
| 2008/0111864 A1* | 5/2008 | Yamaguchi | B41J 2/0452 347/59 |
| 2015/0062212 A1 | 3/2015 | Umeda et al. | |

FOREIGN PATENT DOCUMENTS

| | | |
|---|---|---|
| CN | 1522858 A | 8/2004 |
| CN | 101574865 A | 11/2009 |
| EP | 1920929 A1 | 5/2008 |
| JP | 7-68761 A | 3/1995 |
| JP | 2003-145742 A | 5/2003 |
| JP | 2008-119971 A | 5/2008 |
| JP | 2013-215959 A | 10/2013 |

* cited by examiner

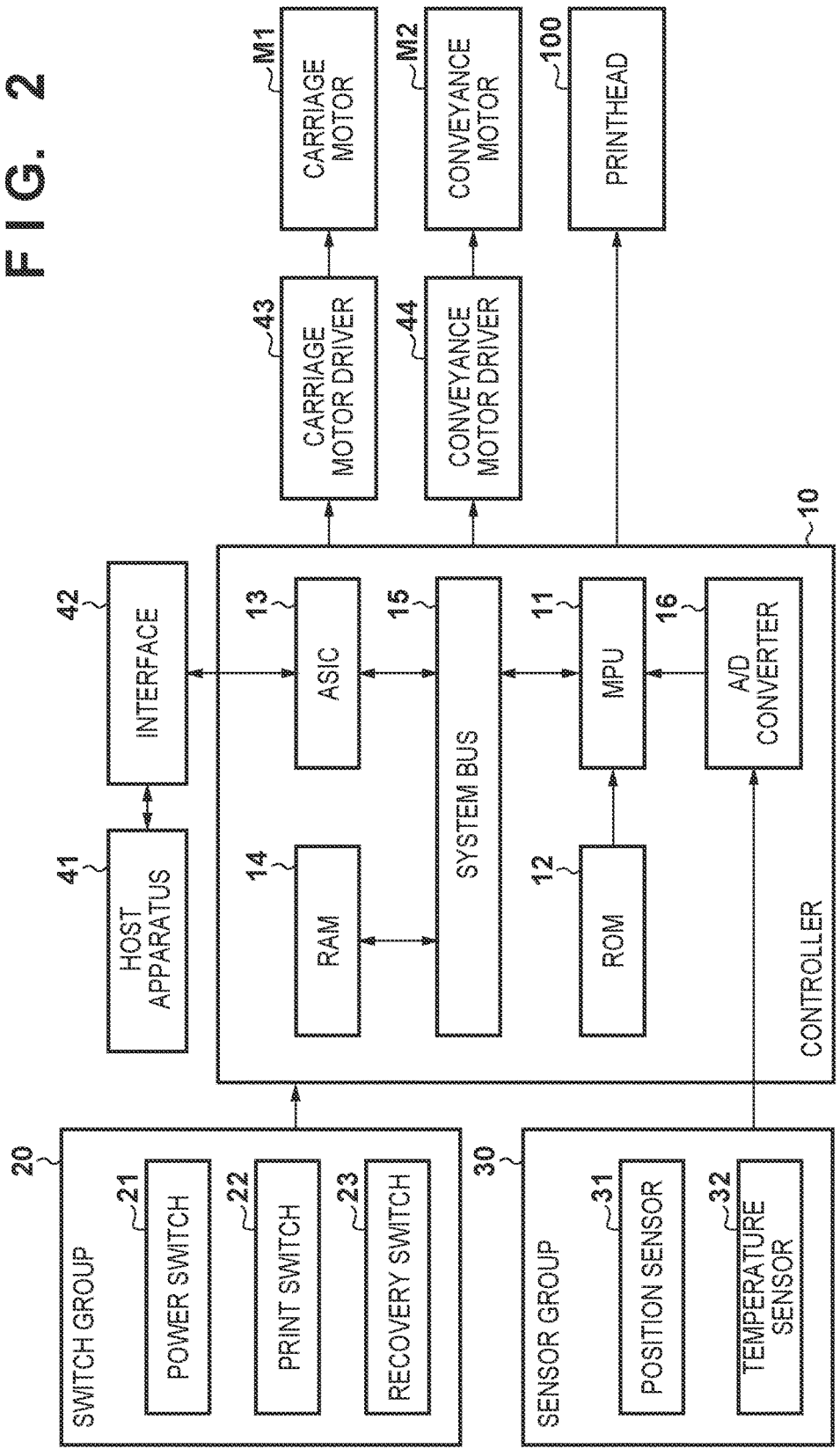

ELEMENT SUBSTRATE, PRINTHEAD, AND PRINTING APPARATUS

BACKGROUND OF THE INVENTION

Field of the Invention

The present invention relates to an element substrate, a printhead, and a printing apparatus.

Description of the Related Art

There is conventionally provided a printing apparatus which includes a printhead according to an inkjet method of printing using thermal energy. The inkjet printhead includes, as printing elements, heating elements (heaters) provided in portions communicating with orifices for discharging ink droplets. Then, the heating elements are applied with a current to generate heat, and discharge ink droplets by film boiling of ink, thereby executing printing.

Along with a recent increase in speed, power supplied to heaters in an inkjet printhead substrate becomes large, and noise at the time of heater driving is a problem. As a method of relaxing the noise, for example, in Japanese Patent Laid-Open No. 7-68761, the rising and falling edges of the total heater current of a chip are moderated by slightly shifting heat driving timings between heaters by a delay circuit, and thus the high-frequency noise of a power supply is relaxed, thereby improving the reliability.

However, a recent increase in number of nozzles or number of heaters simultaneously driven increases the number of delay circuits for a heat enable signal. As a result, the total delay amount of the heat enable signal increases, thereby causing a problem that heat driving is executed outside a latch cycle. If the delayed heat enable signal exceeds the latch cycle, this means that data is switched during driving. That is, desired energy cannot be applied to the heaters, and thus no printing is executed. In addition, the heaters selected in the next cycle are unnecessarily heated.

By extending the latch cycle, printing can be normally executed. However, extension of the cycle means a decrease in print speed. The print speed is ensured by shortening the delay amount of the heat enable signal so as to include the heat enable signal in the latch cycle. However, the rising and falling edges of the heater current become sharp to generate high-frequency noise, thereby causing an erroneous operation of the substrate or radiation noise.

SUMMARY OF THE INVENTION

According to one aspect of the present invention, there is provided an element substrate comprising: printing elements; a reception unit configured to receive first print data and second print data; a data latch unit configured to latch, based on a first signal, the first print data and the second print data which have been received by the reception unit; a first driving unit configured to drive the printing elements based on a timing of a second signal and a logical operation result of printing element selection data and the first print data latched by the data latch unit; a delay unit configured to delay the second signal by a predetermined time; an operation result latch unit configured to latch, based on the second signal delayed by the delay unit, a result of a logical operation of the printing element selection data and the second print data latched by the data latch unit; and a second driving unit configured to drive the printing elements in accordance with the operation result latched by the operation result latch unit and the second signal delayed by the delay unit.

According to another aspect of the present invention, there is provided a printhead comprising at least one element substrate, the element substrate including printing elements, a reception unit configured to receive first print data and second print data, a data latch unit configured to latch, based on a first signal, the first print data and the second print data which have been received by the reception unit, a first driving unit configured to drive the printing elements based on a timing of a second signal and a logical operation result of printing element selection data and the first print data latched by the data latch unit, a delay unit configured to delay the second signal by a predetermined time, an operation result latch unit configured to latch, based on the second signal delayed by the delay unit, a result of a logical operation of the printing element selection data and the second print data latched by the data latch unit, and a second driving unit configured to drive the printing elements in accordance with the operation result latched by the operation result latch unit and the second signal delayed by the delay unit.

According to another aspect of the present invention, there is provided a printing apparatus comprising at least one printhead which includes at least one element substrate, the element substrate including printing elements, a reception unit configured to receive first print data and second print data, a data latch unit configured to latch, based on a first signal, the first print data and the second print data which have been received by the reception unit, a first driving unit configured to drive the printing elements based on a timing of a second signal and a logical operation result of printing element selection data and the first print data latched by the data latch unit, a delay unit configured to delay the second signal by a predetermined time, an operation result latch unit configured to latch, based on the second signal delayed by the delay unit, a result of a logical operation of the printing element selection data and the second print data latched by the data latch unit, and a second driving unit configured to drive the printing elements in accordance with the operation result latched by the operation result latch unit and the second signal delayed by the delay unit.

According to the present invention, it is possible to reduce power supply noise at the time of heater driving without decreasing the print speed.

Further features of the present invention will become apparent from the following description of exemplary embodiments (with reference to the attached drawings).

BRIEF DESCRIPTION OF THE DRAWINGS

FIG. 2 is a block diagram showing an example of the control arrangement of the inkjet printing apparatus according to the present invention;

DESCRIPTION OF THE EMBODIMENTS

Figure 1:
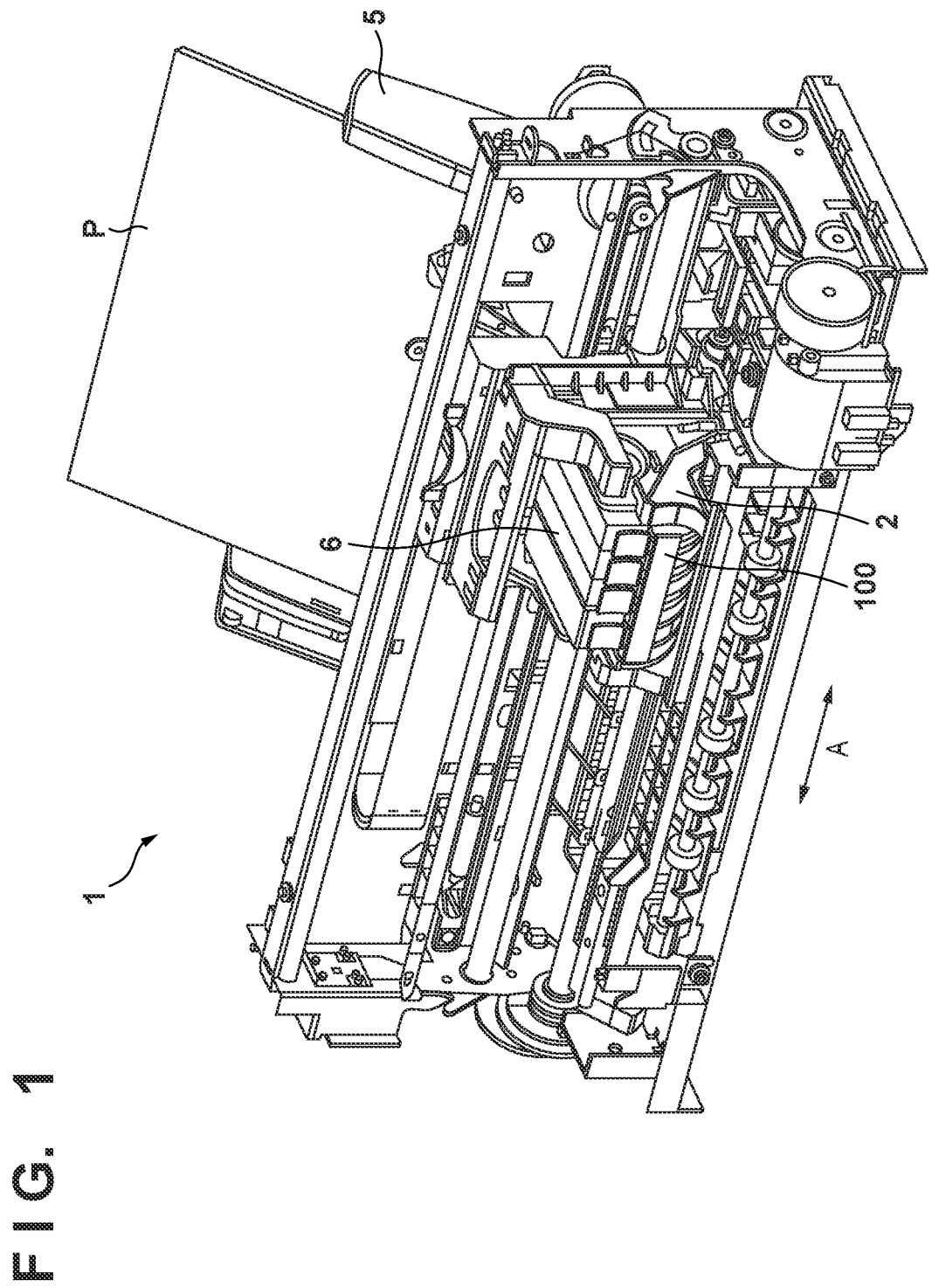
FIG. 1 is a perspective view showing an example of the outer appearance of an inkjet printing apparatus according to the present invention.

Preferred embodiments of the present invention will be described below more concretely and in more detail with reference to the accompanying drawings. It should be noted that the relative arrangement of components and the like set forth in the embodiments do not limit the scope of the present invention unless it is specifically stated otherwise.

In this specification, the term "printing" (to be also referred to as "print" hereinafter) not only includes the formation of significant information such as characters and graphics, but also broadly includes the formation of images, figures, patterns, and the like on a printing medium, or the processing of the medium, regardless of whether they are significant or insignificant and whether they are so visualized as to be visually perceivable by humans.

In addition, the term "printing medium" not only includes a paper sheet used in common printing apparatuses, but also broadly includes materials, such as cloth, a plastic film, a metal plate, glass, ceramics, wood, and leather, capable of accepting ink.

Furthermore, the term "ink" (to be also referred to as a "liquid" hereinafter) should be extensively interpreted similarly to the definition of "printing (print)" described above. That is, "ink" includes a liquid which, when applied onto a printing medium, can form images, figures, patterns, and the like, can process the printing medium, or can process ink (for example, solidify or insolubilize a coloring agent contained in ink applied to the printing medium).

Further, a "printing element" generically means an orifice or a liquid channel communicating with it, and an element for generating energy used to discharge ink, unless otherwise specified.

Further, a "nozzle" generically means an orifice or a liquid channel communicating with it, and an element for generating energy used to discharge ink, unless otherwise specified.

A printhead element substrate (head substrate) used below means not merely a base made of a silicon semiconductor, but an arrangement in which elements, wiring lines, and the like are arranged.

Further, "on the substrate" means not merely "on an element substrate", but even "the surface of the element substrate" and "inside the element substrate near the surface". In the present invention, "built-in" means not merely arranging respective elements as separate members on the base surface, but integrally forming and manufacturing respective elements on an element substrate by a semiconductor circuit manufacturing process or the like.

An inkjet printhead (to be referred to as a printhead hereinafter) which constitutes the most important characteristic of the present invention implements, on the same printhead element substrate, a plurality of printing elements and a driving circuit which drives these printing elements. As will be apparent from the following description, a structure is adopted in which the printhead incorporates a plurality of element substrates, and these element substrates are cascade-connected to each other. Therefore, this printhead can achieve a relatively large printing width. The printhead is used for not only a general serial type printing apparatus but also a printing apparatus including a full-line printhead whose printing width corresponds to the width of a printing medium. Furthermore, the printhead is used for a large format printer using a printing medium of a large size such as A0 or B0 size among serial type printing apparatuses.

A printing apparatus which uses a printhead according to the present invention will be described first.

[Overview of Printing Apparatus]

FIG. 1 is a perspective view showing the outer appearance of a printing apparatus which prints using an inkjet printhead (to be referred to as a printhead hereinafter) according to a representative embodiment of the present invention.

As shown in FIG. 1, an inkjet printing apparatus (to be referred to as a printing apparatus hereinafter) 1 mounts, on a carriage 2, an inkjet printhead (to be referred to as a printhead hereinafter) 100 for printing by discharging ink according to an inkjet method, and prints by reciprocating the carriage 2 in directions indicated by an arrow A. A printing medium P such as printing paper is fed via a paper feed mechanism 5, and conveyed to a printing position. At the printing position, the printhead 100 discharges ink onto the printing medium P, thereby printing.

In addition to the printhead 100, ink tanks 6 each storing ink to be supplied to the printhead 100 are attached to the carriage 2 of the printing apparatus 1. The ink tanks 6 are detachable from the carriage 2.

The printing apparatus 1 shown in FIG. 1 is capable of color printing. To do this, four ink cartridges which contain magenta (M), cyan (C), yellow (Y), and black (K) inks are mounted on the carriage 2. These four ink cartridges are independently detachable.

The printhead 100 according to the present invention adopts an inkjet method of discharging ink using thermal energy. Accordingly, the printhead 100 includes electrothermal transducers. These electrothermal transducers are provided in correspondence with respective orifices. A pulse voltage is applied to a corresponding electrothermal transducer in accordance with a print signal, thereby discharging ink from a corresponding orifice. Note that the printing apparatus is not limited to the above-described serial type printing apparatus and is also applicable to a so-called full-line type printing apparatus which arranges, in the conveyance direction of the printing medium, a printhead (line head) with orifices arrayed in the widthwise direction of the printing medium.

FIG. 2 is a block diagram showing the control arrangement of the printing apparatus shown in FIG. 1.

As shown in FIG. 2, a controller 10 includes an MPU 11, a ROM 12, an application specific integrated circuit (ASIC) 13, a RAM 14, a system bus 15, and an A/D converter 16. The ROM 12 stores programs corresponding to various control sequences, necessary tables, and other fixed data. The ASIC 13 generates control signals to control a carriage motor M1, a conveyance motor M2, and the printhead 100. The RAM 14 is used as an image data rasterization area, a work area for program execution, and the like. The system bus 15 connects the MPU 11, the ASIC 13, and the RAM 14 to each other and exchanges data. The A/D converter 16 receives an analog signal from a sensor group (to be described below), A/D-converts it, and supplies the digital signal to the MPU 11.

Referring to FIG. 2, a host apparatus 41 is an external information processing apparatus such as a PC serving as an image data supply source. The host apparatus 41 transmits/receives image data, commands, statuses, and the like to/from the printing apparatus 1 via an interface (I/F) 42 by packet communication. Note that a USB interface may be provided as the interface 42 in addition to a network interface, thereby making it possible to receive bit data or raster data serially transferred from the host.

A switch group 20 includes, for example, a power switch 21, a print switch 22, and a recovery switch 23.

A sensor group 30 is used to detect an apparatus state, and includes, for example, a position sensor 31 and a temperature sensor 32. The sensor group 30 also includes a photosensor which detects the remaining ink amount.

A carriage motor driver 43 drives the carriage motor M1 to reciprocally scan the carriage 2 in the directions of the arrow A. A conveyance motor driver 44 drives the conveyance motor M2 to convey the printing medium P.

At the time of print scanning by the printhead 100, the ASIC 13 transfers, to the printhead, data for driving heating elements (ink discharge heaters) while directly accessing the storage area of the RAM 14. This printing apparatus additionally includes, as a user interface, a display unit formed by an LCD or LED.

Figure 3A:
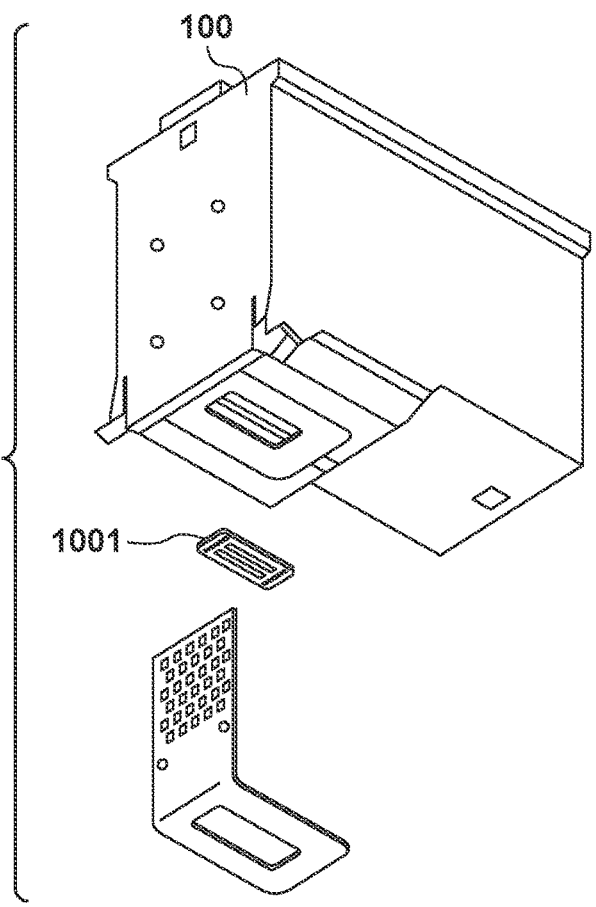
FIGS. 3A and 3B are views schematically showing the outer appearances of a printhead substrate and a printhead.
Figure 3B:
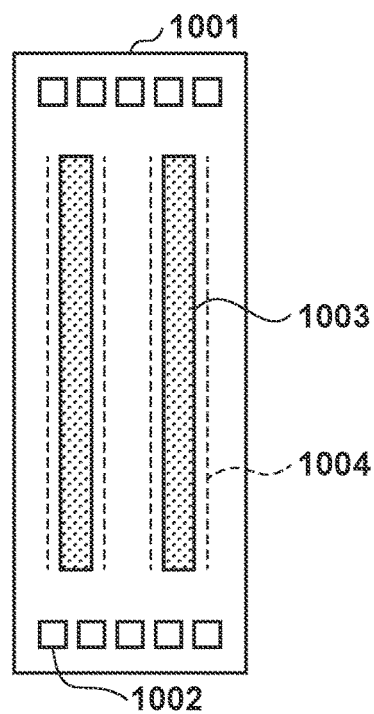

An embodiment of a printhead substrate (element substrate) which forms a liquid discharge head used as a printhead in the printing apparatus with the above-described arrangement will now be described. FIG. 3A schematically shows the outer appearance of a printhead substrate 1001. The printhead substrate 1001 includes power supply/signal PADs 1002, ink supply ports 1003 from the ink tanks 6, and a heater array 1004 formed by an array of heaters serving as heating elements. FIG. 3B is a view schematically showing the outer appearance of the printhead 100. As described above, the ink tanks 6 are mountable, and ink is supplied from them. Then, the printhead 100 is provided with the printhead substrate 1001.

[Circuit Arrangement Example]

Figure 4:
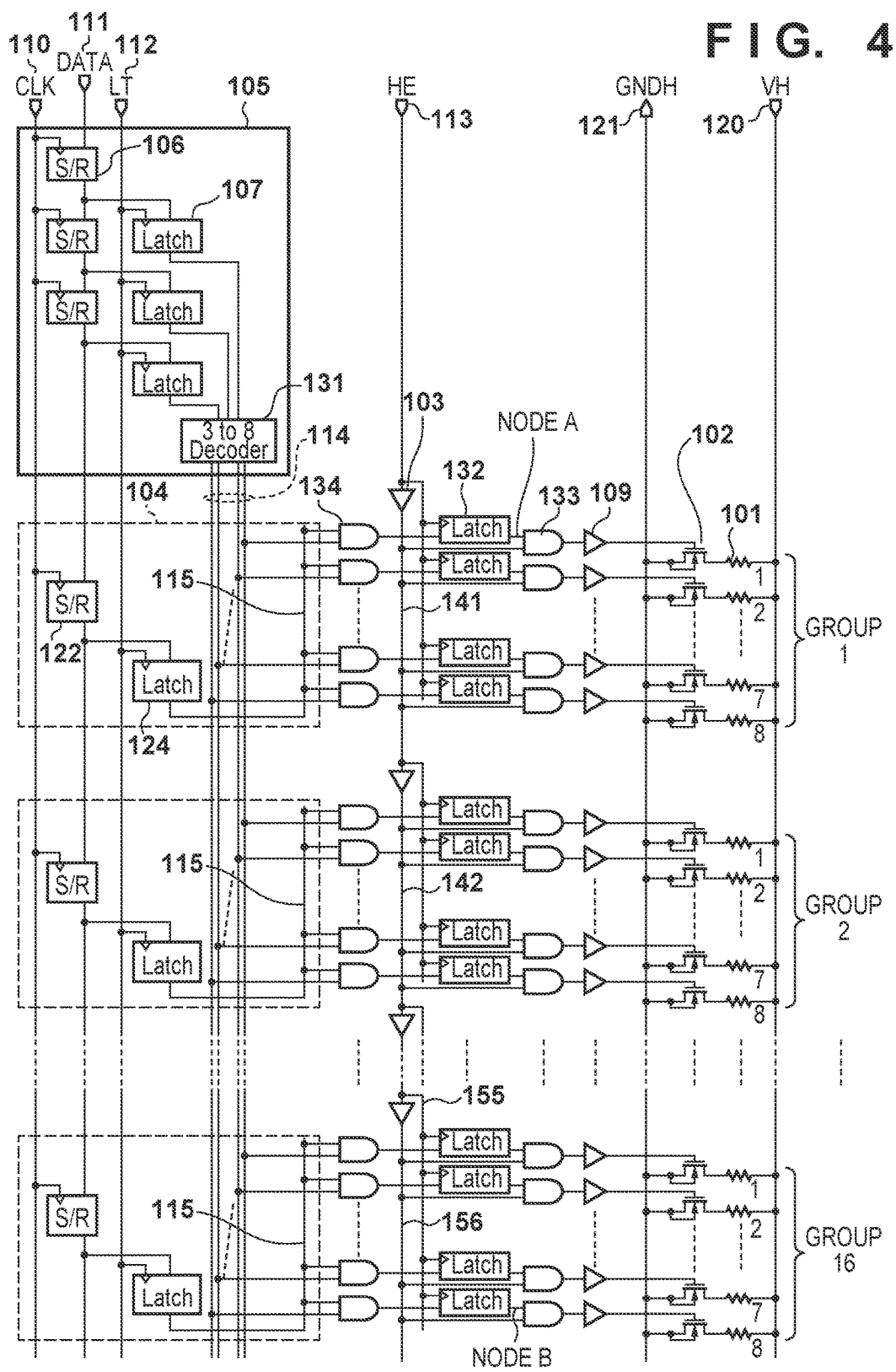
FIG. 4 is a circuit diagram showing the printhead substrate according to the present invention.
Figure 5:
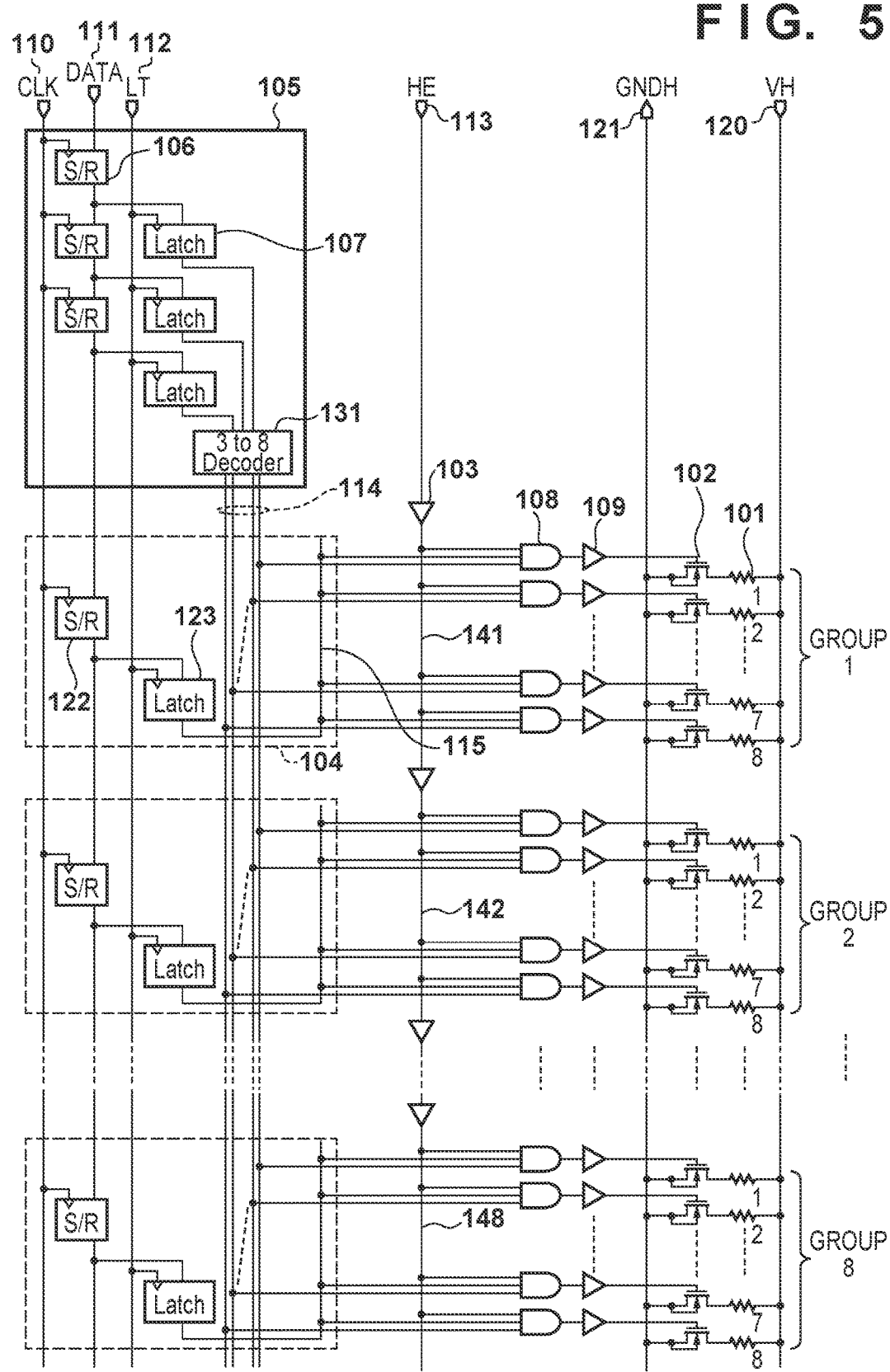
FIG. 5 is a circuit diagram showing a printhead substrate according to a comparative example.

FIG. 4 is a circuit diagram showing the circuit arrangement according to this embodiment. FIG. 5 is a circuit diagram showing an example to be compared with the circuit arrangement of the present invention. The arrangements shown in FIGS. 4 and 5 each include a time-divisional driving circuit for time-divisionally driving a plurality of heaters. In the comparative example, the number of groups of circuit blocks is eight. On the other hand, in this embodiment, the number of groups is 16. As shown in FIG. 4, adjacent heaters form one group. The plurality of arrayed heaters are divided into a plurality of groups.

Figure 6:
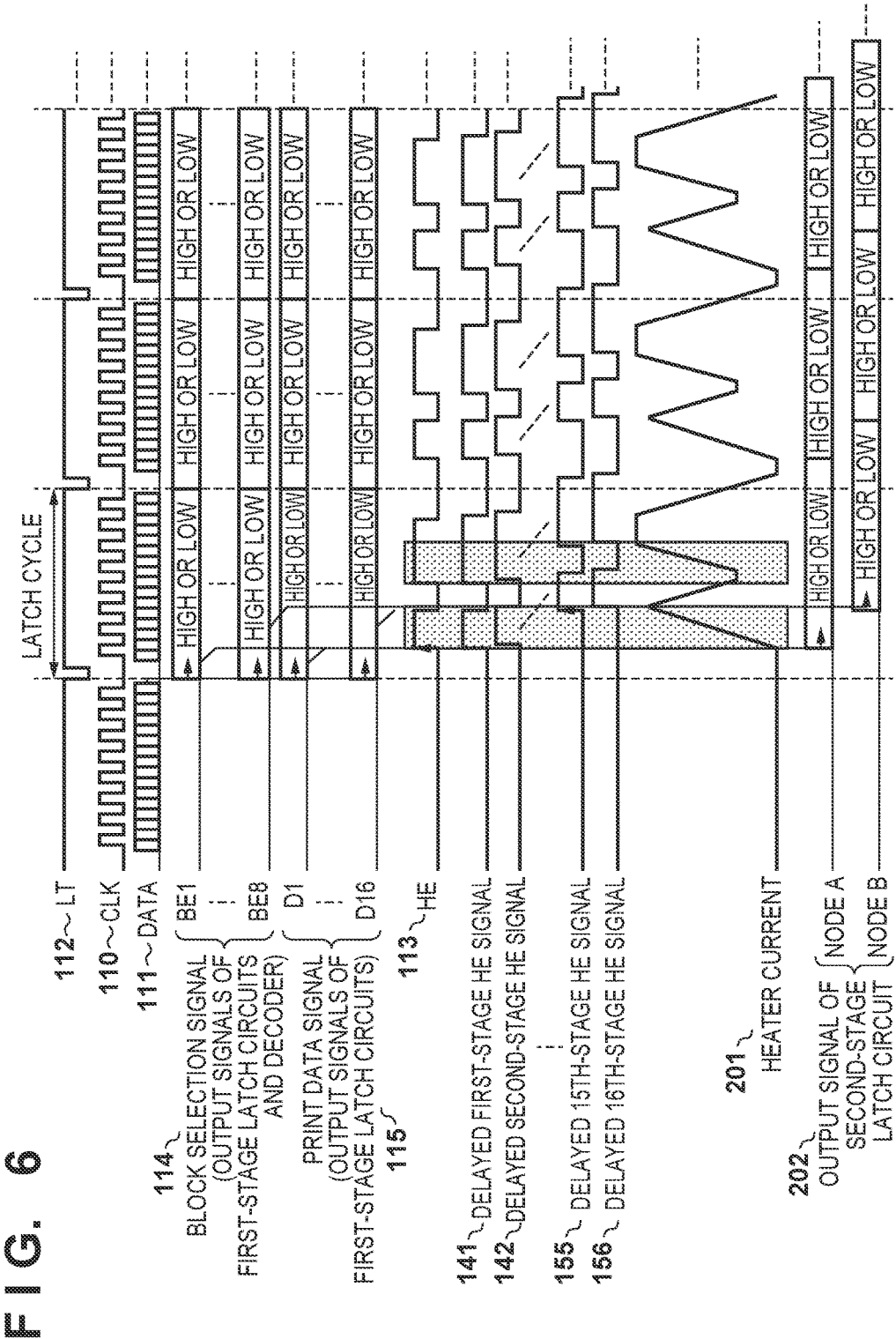
FIG. 6 is a driving timing chart according to the present invention.
Figure 7:
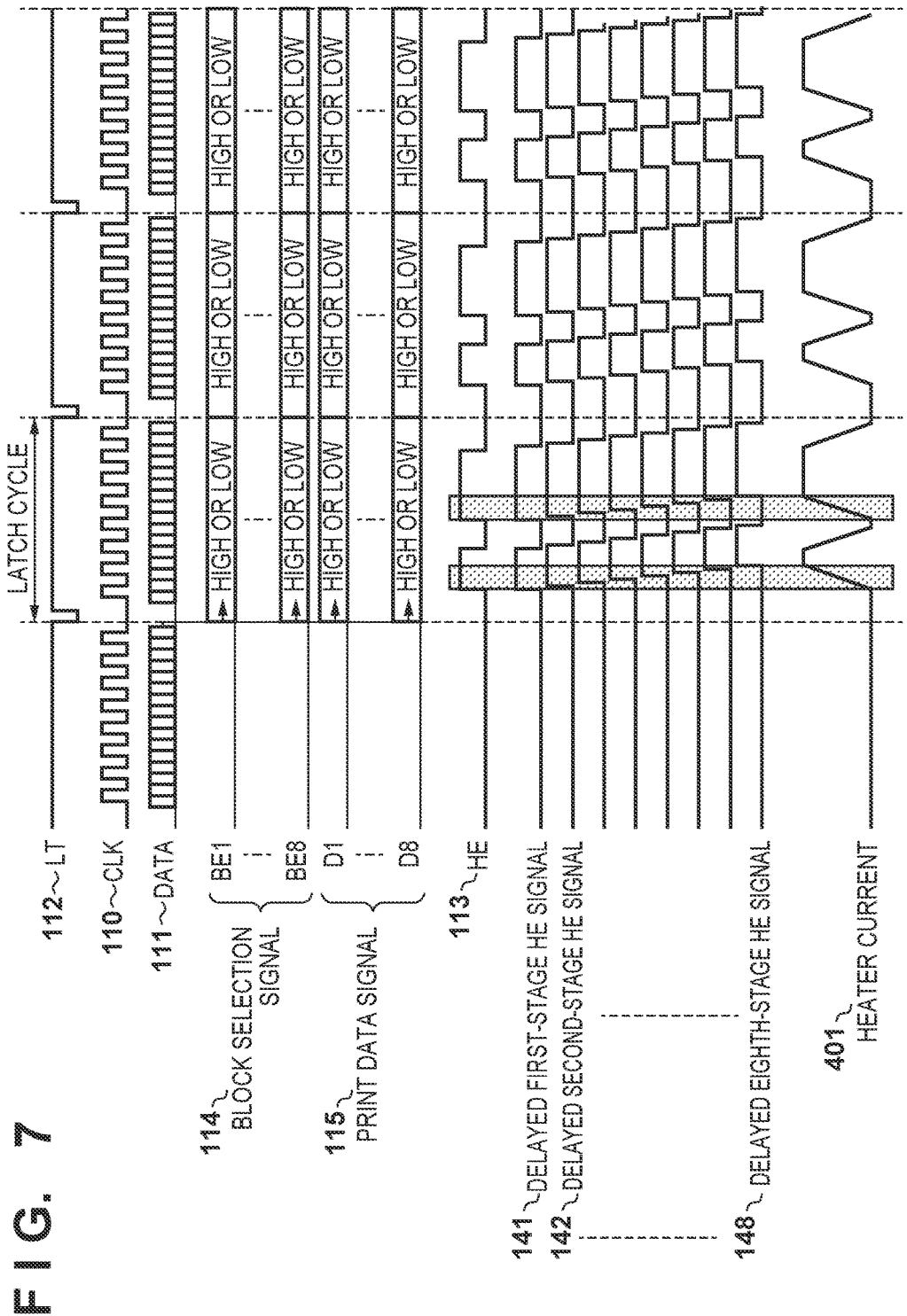
FIG. 7 is a driving timing chart according to the comparative example of the printhead substrate.

FIG. 6 is a driving timing chart according to this embodiment. FIG. 7 is a driving timing chart according to the comparative example.

Driving according to the comparative example (FIGS. 5 and 7) will be described first. In the comparative example shown in FIG. 5, the printhead substrate includes heaters 101 serving as heating elements, driver transistors 102 for respectively driving the heaters 101, and HE delay circuits 103 for delaying a heat enable signal (HE). The printhead substrate 1001 also includes print data supply circuits 104, a block selection circuit 105, AND circuits 108, and booster circuits 109. The block selection circuit 105 includes shift registers 106 and latch circuits 107, and receives a clock signal (CLK) 110, print data (DATA) 111, and a latch signal (LT) 112. Each heater 101 is connected to a driving power supply (VH) 120, and each driver transistor 102 is connected to ground (GNDH) 121. A plurality of circuit blocks each formed from the corresponding heater 101, driver transistor 102, AND circuit 108, and booster circuit 109 are set as a group, and the HE delay circuit 103 is provided for each group.

In this comparative example, eight groups are shown, and each group includes eight circuit blocks. Referring to FIG. 5, numbers assigned to the heaters 101 of the respective groups each indicate the heaters 101 which start to operate in the same latch cycle. For example, among the heaters 101 of the respective groups, the heaters 101 assigned with 1 can operate at the same timing. Similarly, among the heaters 101 of the respective groups, the heaters 101 assigned with 2 start to operate in the same latch cycle. In this way, the eight printing elements included in each group start driving in different latch cycles.

In the block selection circuit 105, the DATA 111 is input to the shift registers 106 in synchronism with the signal edge of the CLK 110, and held in the latch circuits 107 at a timing (falling edge) when the LT 112 is set at low level. Furthermore, outputs from the latch circuits 107 are input to a decoder 131. The decoder 131 rasterizes the outputs from the latch circuits 107, and outputs them as a block selection signal 114 (BE1 to BE8). The block selection signal 114 is used to select one of blocks 1 to 8 of each group, and output by setting, at high level, only one bit of the 8-bit signal corresponding to the selected block circuit. That is, the block selection signal 114 selects one of heaters 1 to 8 of each group to be driven. The decoder 131 converts inputs (3 bits) from the three latch circuits 107 into the 8-bit block selection signal 114. In the example shown in FIGS. 5 and 7, in accordance with the block selection signal 114 and print data signals 115, the heaters 101 to be driven are selected in an 8×8 matrix. The DATA 111 is output to the print data supply circuits 104 via the block selection circuit 105 (shift registers 106).

Each print data supply circuit 104 includes a shift register 122 and a latch circuit 123. In each print data supply circuit 104, the shift register 122 receives the DATA 111 input via the block selection circuit 105. Based on the LT 112, the DATA 111 is latched in the latch circuit 123, and output as the print data signal 115 to each circuit block of the corresponding group.

An HE 113 is a heat enable signal for determining a period during which a current flows in the heater 101. A current flows in the desired heater 101 during a period in which the logic of this signal is at high level. Based on the input signals, each AND circuit 108 determines selection of the heater to be driven and the driving period of the heater. The amplitude of a signal output from each AND circuit 108 is amplified by the corresponding booster circuit 109 to drive the corresponding driver transistor 102. Switching of the driver transistor 102 causes a current to flow to the heater 101 serving as a printing element (heating element) from the VH 120 to heat the heater 101, thereby foaming and discharging ink. This prints on the printing medium.

The arrangement according to this embodiment will be described below with reference to FIGS. 4 and 6. A description will be provided by paying attention to the difference from the arrangement shown in FIG. 5. In this embodiment, a description will be provided using an example of a 16×8 matrix obtained by doubling the number of heaters 101. The value of the matrix is different but selection of heaters 101 to be driven in accordance with a block selection signal 114 and print data signals 115 is the same. In this embodiment, the number of groups increases to 16. Along with this, the number of HE delay circuits 103 increases twice, that is, 16. The integrated value of a heater current 201 flowing to the VH 120 becomes twice that (a heater current 401 of FIG. 7) of the comparative example. Note that a delay amount and a latch cycle for each HE delay circuit 103 are the same between the embodiment and the comparative example.

As shown in FIG. 4, the HE delay circuit 103 is provided for each group. Input of the HE to each group is delayed in stages. As a result, the number of HE delay circuits 103 increases, and thus the timings at which a delayed 15th-stage HE signal 155 and a delayed 16th-stage HE signal 156 are set at high level are included in the next latch cycle, as shown in FIG. 6. To cope with this, in the arrangement according to this embodiment, the latch circuits are series-connected in two stages. This allows normal driving even under a condition that the timings are over latch cycles. In this embodiment, a latch circuit 124 included in each print data supply circuit 104 is set as a first-stage latch circuit, and second-stage latch circuits 132 are additionally provided.

Each AND circuit 108 according to the comparative example (FIG. 5) has a three-input AND arrangement which receives the block selection signal 114, the print data signal 115, and a signal obtained by delaying the HE 113.

On the other hand, in the arrangement (FIG. 4) according to this embodiment, two-input first-stage AND circuits 134 each of which receives the block selection signal 114 and the print data signal 115 are provided. Furthermore, the second-stage latch circuits 132 each of which holds a signal from the first-stage AND circuit 134 based on the HE 113 are newly added. In addition, two-input second-stage AND circuits 133 each of which receives an output from the second-stage latch circuit 132 and the HE 113 are provided. Each second-stage latch circuit 132 receives the HE delayed by the HE delay circuit of the preceding stage.

In this embodiment, the first-stage AND circuit 134 and the second-stage AND circuit 133 are provided as the AND circuits functioning as control circuits each of which controls an output from each corresponding latch circuit. The reason for this is to cause the second-stage latch circuit 132 to hold an AND output (to be referred to as heater selection data hereinafter) of the block selection signal 114 and the print data signal 115 immediately before heater driving.

FIG. 6 is a driving timing chart according to this embodiment. FIG. 6 shows an output 202 from the second-stage latch circuit 132. As shown in FIG. 4, node A is an output from the second-stage latch circuit 132, and an AND output of BE1 and D1 from the first-stage AND circuit 134 is connected to the second-stage latch circuit 132. The second-stage latch circuit 132 as the output of node A holds the heater selection data at the rising edge when the HE 113 is set at high level. As shown in FIG. 4, the second-stage latch circuit 132 which outputs node A holds the heater selection data based on the HE 113 which has not been delayed by the HE delay circuit 103. At the moment immediately after the input of the heater selection data, the second-stage AND circuit 133 outputs a signal to drive the corresponding heater (if the heater is selected) based on a delayed first-stage HE signal 141 obtained by delaying the HE 113 by one stage by the HE delay circuit 103. This signal is then supplied to the driver transistor 102 via the booster circuit 109 to drive the corresponding heater.

The heater selection data of node A is held until the HE 113 is set at high level again in the next cycle. As for node B, similarly, the delayed 15th-stage HE signal 155 holds the heater selection data in the second-stage latch circuit 132. The second-stage AND circuit 133 outputs a signal to drive the corresponding heater (if the heater is selected) based on the delayed 16th-stage HE signal 156 obtained by delaying the delayed 15th-stage HE signal 155 by one stage by the HE delay circuit 103. This signal is then supplied to the driver transistor 102 via the booster circuit 109 to drive the corresponding heater.

As described above, the second-stage latch circuit 132 latches data in accordance with the HE signal of the HE delay circuit 103 of the preceding stage. In this embodiment, this makes it possible to drive the heater immediately after the heater selection data is reliably confirmed. Note that if the timing at which the heater to be driven is confirmed is the same as the timing at which the heater is heated, or before or after the timing, heater selection is not confirmed at start of heater driving. As a result, it may be impossible to apply desired energy to the desired heater. This embodiment prevents this problem.

In this embodiment, the timing at which the heater selection data is confirmed comes in the cycle of the HE signal. Thus, there is no influence of the latch cycle, and even if the HE signal is delayed to exceed the latch cycle, normal driving is possible.

In the arrangement of this embodiment, it is possible to provide an HE delay circuit 103 (a plurality of HE delay circuits) which generates a delay amount longer than that in the arrangement of the comparative example, thereby ensuring higher reliability. In addition, by shifting the heat timing by increasing the delay amount, it is possible to decrease the peak of the heater current 201. In the arrangement of the comparative example, to perform normal driving, the HE signal including the delay amount needs to be reliably included in the latch cycle. In the conventional example, therefore, as the current peak decreases, it is more difficult to gain the delay amount. On the other hand, in the arrangement of this embodiment, it is not necessary to include the delay amount of the HE signal in the latch cycle. Thus, a larger delay amount can be provided, as compared with the conventional example.

In addition to noise reduction, the arrangement of this embodiment can decrease the power supply capacity of the main body, and also reduce the cost. Note that as one of other methods of performing heater driving over latch cycles like this embodiment, for example, there is provided interlace driving of completely dividing heaters of the same column into an odd-number group and an even-number group and performing driving at different timings. This method can perform heater driving in twice the latch cycle, and gain the delay time, thereby obtaining the same effects as in the present invention. However, this method needs twice the circuit scale, and also needs two systems for each signal. To the contrary, in this embodiment, it is not necessary to increase the number of signals, and the circuit scale increases by only the second-stage latch circuits 132.

Note that in this embodiment, the condition for implementing normal driving is that the rising edges of the HE 113 and the delayed first-stage HE signal 141 to the delayed 16th-stage HE signal 156 are included in the latch cycle. In other words, the timing of the first rising edge of the HE 113 and the timing of the last rising edge of the delayed last-stage HE (in the example of FIG. 6, the delayed 16th-stage HE signal 156) are included in the latch cycle. In this example, since a double pulse is used as the HE 113, the first rising edge of the HE 113 is the rising edge of the first pulse and the last rising edge of the last-stage HE is the rising edge of the second pulse. If the latch cycle is exceeded, the heater selection data of the next latch cycle is held in the second-stage latch circuit 132, and the heater driving cycle shifts, thereby causing an erroneous operation. That is, if the timing of the last rising edge of the last-stage HE is included in the latch cycle, groups of 16 or more stages can be formed, and the HE signal can be delayed accordingly.

In this embodiment, the HE signal of the HE delay circuit 103 of the preceding stage is used as the latch signal of the second-stage latch circuit 132. The present invention, however, is not limited to this. A delay circuit with a different delay amount may be provided for each second-stage latch circuit 132. Furthermore, a signal other than the HE signal may be additionally provided, and the latch operation of the second-stage latch circuit 132 may be controlled using this signal.

This embodiment has explained the latch two-stage series arrangement. The present invention, however, is not limited to this, and a series arrangement of three or more stages may be adopted.

Figure 8:
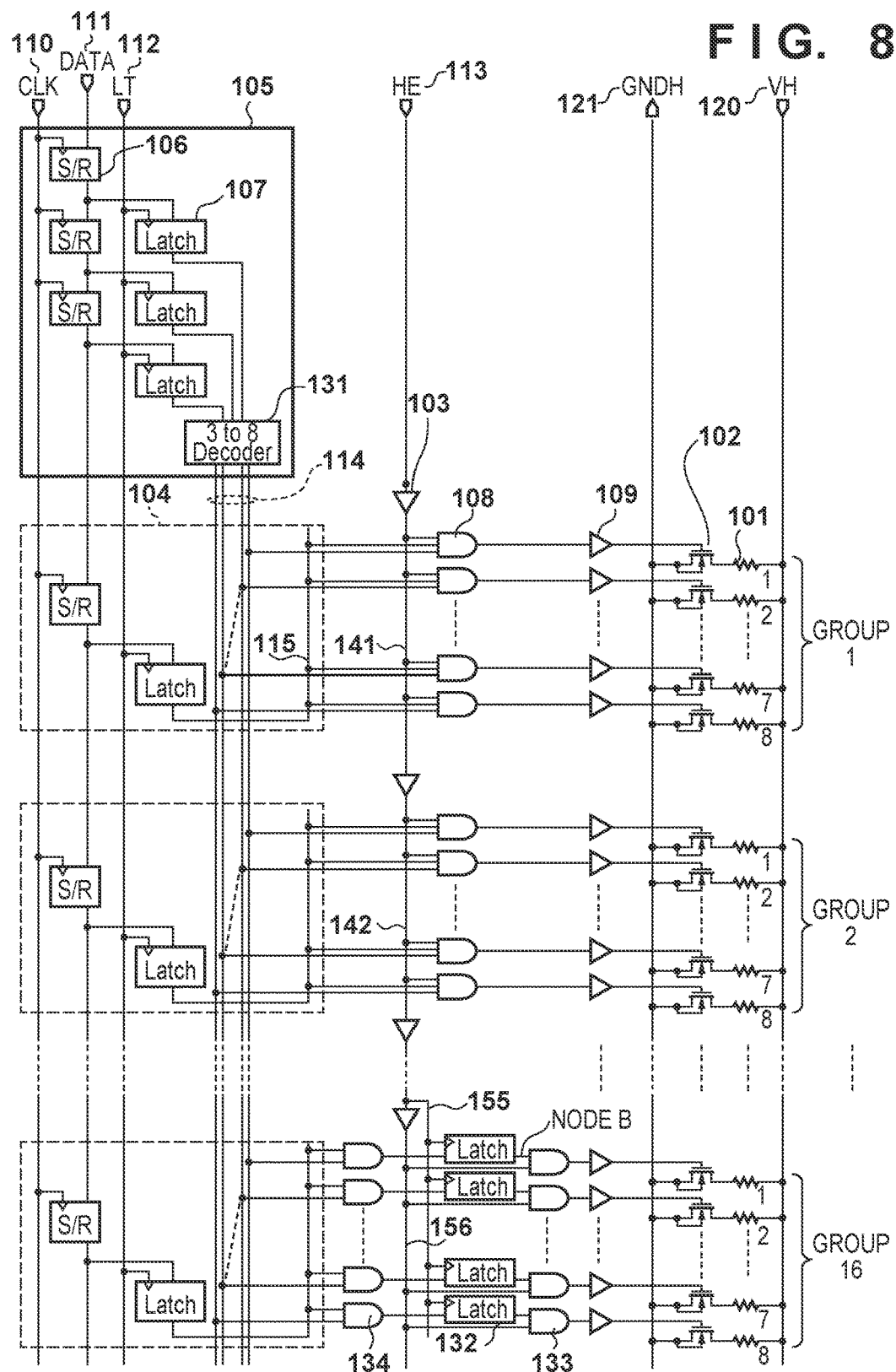
FIG. 8 is a circuit diagram showing a printhead substrate according to another embodiment of the present invention.

Another embodiment will be described. A case in which in some of 16 groups, a heater driving timing cannot be included in a latch cycle will be explained. If, for example, a heater driving timing cannot be included in the latch cycle in only group 16, second-stage latch circuits 132 may be provided in only group 16, as shown in FIG. 8. Similarly, if a heater driving timing cannot be included in the latch cycle in groups 15 and 16, second-stage latch circuits 132 may be provided in groups 15 and 16.

This embodiment has described the arrangement of the thermal method of printing by heating and foaming ink. The present invention may be applied to an arrangement of a piezoelectric method. The present invention is applicable to any of a scan type printing apparatus and full-line type printing apparatus.

According to this embodiment, it is possible to relax power supply noise at the time of heater driving without decreasing the print speed. It is also possible to decrease the peak power, and reduce the cost.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-154945, filed Aug. 5, 2016, which is hereby incorporated by reference herein in its entirety.

What is claimed is:

1. An element substrate comprising:
   printing elements which are divided into a plurality of groups;
   shift registers configured to receive print data based on a clock signal wherein each of the shift registers corresponds to each of the plurality of groups;
   data latch circuits configured to latch, based on a latch signal, the print data which have been received by the shift registers, and output print data signals;
   a selection circuit configured to output selection signals, wherein the selection signals are assigned for each group so that one printing element is selected from each of the plurality of groups;
   delay circuits configured to delay a heat enable signal, wherein each of the delay circuits delays the heat enable signal by a predetermined time;
   operation result latch circuits configured to latch, based on either the heat enable signal or the heat enable signal delayed by the delay circuits, a result of a logical operation of the selection signals output from the selection circuit and the print data signals output from the data latch circuits; and
   driving circuits configured to drive the printing elements in accordance with the operation result latched by the operation result latch circuits and the heat enable signal delayed by the delay circuits.

2. The substrate according to claim 1, wherein the printing elements are divided into a plurality of groups each including adjacent printing elements, and the printing elements included in each group are driven at different timings based on the selection signals.

3. The substrates according to claim 1, wherein the selection circuit includes shift registers configured to receive data based on the clock signal, data latch circuits configured to latch, based on the latch signal, the data which have been received by the shift registers and output signals, and a decoder configured to output selection signals based on the signals output from the data latch circuits.

4. The substrate according to claim 1, further comprising first AND circuits configured to receive the selection signals and the print data signals, and output a result of an AND operation.

5. The substrate according to claim 1, further comprising second AND circuits configured to receive the heat enable signal delayed by the delay circuits and signals output from the operation result latch circuits, and output a result of an AND operation.

6. The substrate according to claim 1, wherein each of the data latch circuits is provided in correspondence with each of the plurality of groups, and
   each of the operation result latch circuits is provided in correspondence with each of the printing elements in one group.

7. A printhead comprising at least one element substrate, the element substrate including:
   printing elements which are divided into a plurality of groups;
   shift registers configured to receive print data based on a clock signal wherein each of the shift registers corresponds to each of the plurality of groups;
   data latch circuits configured to latch, based on a latch signal, the print data which have been received by the shift registers, and output print data signals;
   a selection circuit configured to output selection signals, wherein the selection signals are assigned for each group so that one printing element is selected from each of the plurality of groups;

delay circuits configured to delay a heat enable signal, wherein each of the delay circuits delays the heat enable signal by a predetermined time;

operation result latch circuits configured to latch, based on either the heat enable signal or the heat enable signal delayed by the delay circuits, a result of a logical operation of the selection signals output from the selection circuit and the print data signals output from the data latch circuits; and driving circuits configured to drive the printing elements in accordance with the operation result latched by the operation result latch circuits and the heat enable signal delayed by the delay circuits.

8. A printing apparatus comprising at least one printhead which includes at least one element substrate, the element substrate including:

printing elements which are divided into a plurality of groups;

shift registers configured to receive print data based on a clock signal wherein each of the shift registers corresponds to each of the plurality of groups;

data latch circuits configured to latch, based on a latch signal, the print data which have been received by the shift registers, and output print data signals;

a selection circuit configured to output selection signals, wherein the selection signals are assigned for each group so that one printing element is selected from each of the plurality of groups;

delay circuits configured to delay a heat enable signal, wherein each of the delay circuits delays the heat enable signal by a predetermined time;

operation result latch circuits configured to latch, based on either the heat enable signal or the heat enable signal delayed by the delay circuits, a result of a logical operation of the selection signals output from the selection circuit and the print data signals output from the data latch circuits; and driving circuits configured to drive the printing elements in accordance with the operation result latched by the operation result latch circuits and the heat enable signal delayed by the delay circuits.

\* \* \* \* \*